US009923433B2

(12) United States Patent
Sangermano, II et al.

(10) Patent No.: US 9,923,433 B2
(45) Date of Patent: Mar. 20, 2018

(54) ENCODER FOR A ROTARY MOTOR

(71) Applicant: Bose Corporation, Framingham, MA (US)

(72) Inventors: Antonio Sangermano, II, Rindge, NH (US); Richard O'Day, Westborough, MA (US)

(73) Assignee: Bose Corporation

( * ) Notice: Subject to any disclaimer, the term of this patent is extended or adjusted under 35 U.S.C. 154(b) by 0 days.

(21) Appl. No.: 14/822,696

(22) Filed: Aug. 10, 2015

(65) Prior Publication Data

US 2017/0047823 A1 Feb. 16, 2017

(51) Int. Cl.
*H02P 6/16* (2016.01)
*H02K 11/215* (2016.01)
*G01D 5/00* (2006.01)

(52) U.S. Cl.
CPC ............ *H02K 11/215* (2016.01); *G01D 5/00* (2013.01); *H02P 6/16* (2013.01)

(58) Field of Classification Search
CPC ............................. B60N 2/501; H01F 13/003
USPC ................... 248/421; 318/400.22; 341/13
See application file for complete search history.

(56) References Cited

U.S. PATENT DOCUMENTS

| 5,121,327 A * | 6/1992 | Salazar ............ G07B 17/00508 |
| | | 318/696 |
| 6,400,109 B1 * | 6/2002 | Helmut ................... H02P 6/16 |
| | | 318/400.11 |
| 2009/0079380 A1 * | 3/2009 | Lundell .............. G05B 23/0235 |
| | | 318/603 |
| 2011/0290978 A1 * | 12/2011 | Keen ...................... B60N 2/501 |
| | | 248/421 |
| 2015/0130571 A1 * | 5/2015 | Tomioka ............... H01F 13/003 |
| | | 335/284 |
| 2015/0243427 A1 * | 8/2015 | Takahashi ............. H01F 13/003 |
| | | 335/284 |

* cited by examiner

*Primary Examiner* — Eduardo Colon Santana
*Assistant Examiner* — Cortez Cook
(74) *Attorney, Agent, or Firm* — Wolf, Greenfield & Sacks, P.C.

(57) ABSTRACT

Systems are described for converting the angular position of a shaft or an axle of a rotary motor to an analog or a digital code indicative of the angular position. The systems may include a magnetic disk encoded with first magnetic transitions and second magnetic transitions, where the first magnetic transitions are on a first circumference of the magnetic disk, the second magnetic transitions are on a second circumference of the magnetic disk, the first magnetic transitions represent regions on the magnetic disk, and the second magnetic transitions represent locations on the magnetic disk within each of the regions. The systems may include a first sensor to detect a region based on the first magnetic transitions and a second sensor to detect a location based on the second magnetic transitions. The systems may also include a decoder to identify an absolute location on the magnetic disk based on the region detected by the first sensor and the location detected by the second sensor.

17 Claims, 15 Drawing Sheets

Hall Effect Line Array = 313
Hall Sensors = 0 0 1 1 0 0
Combined Hall Value = 12

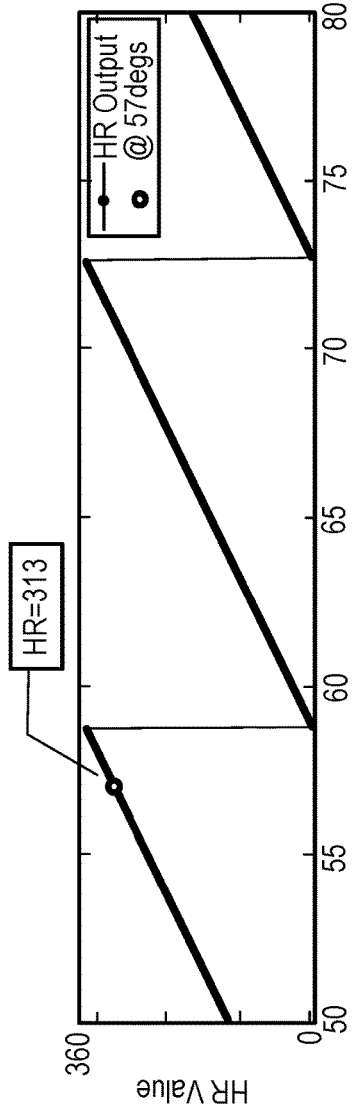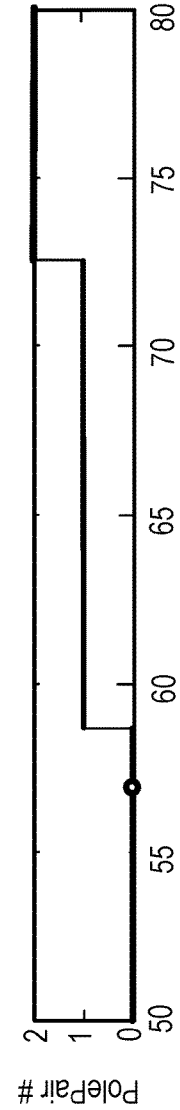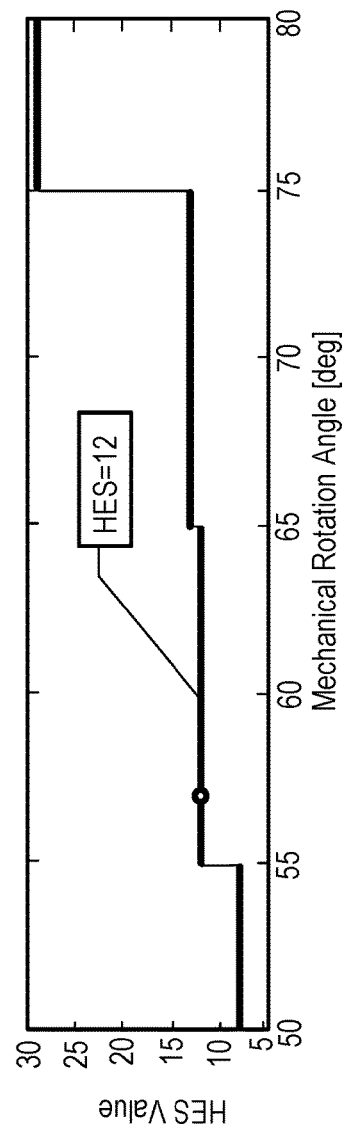

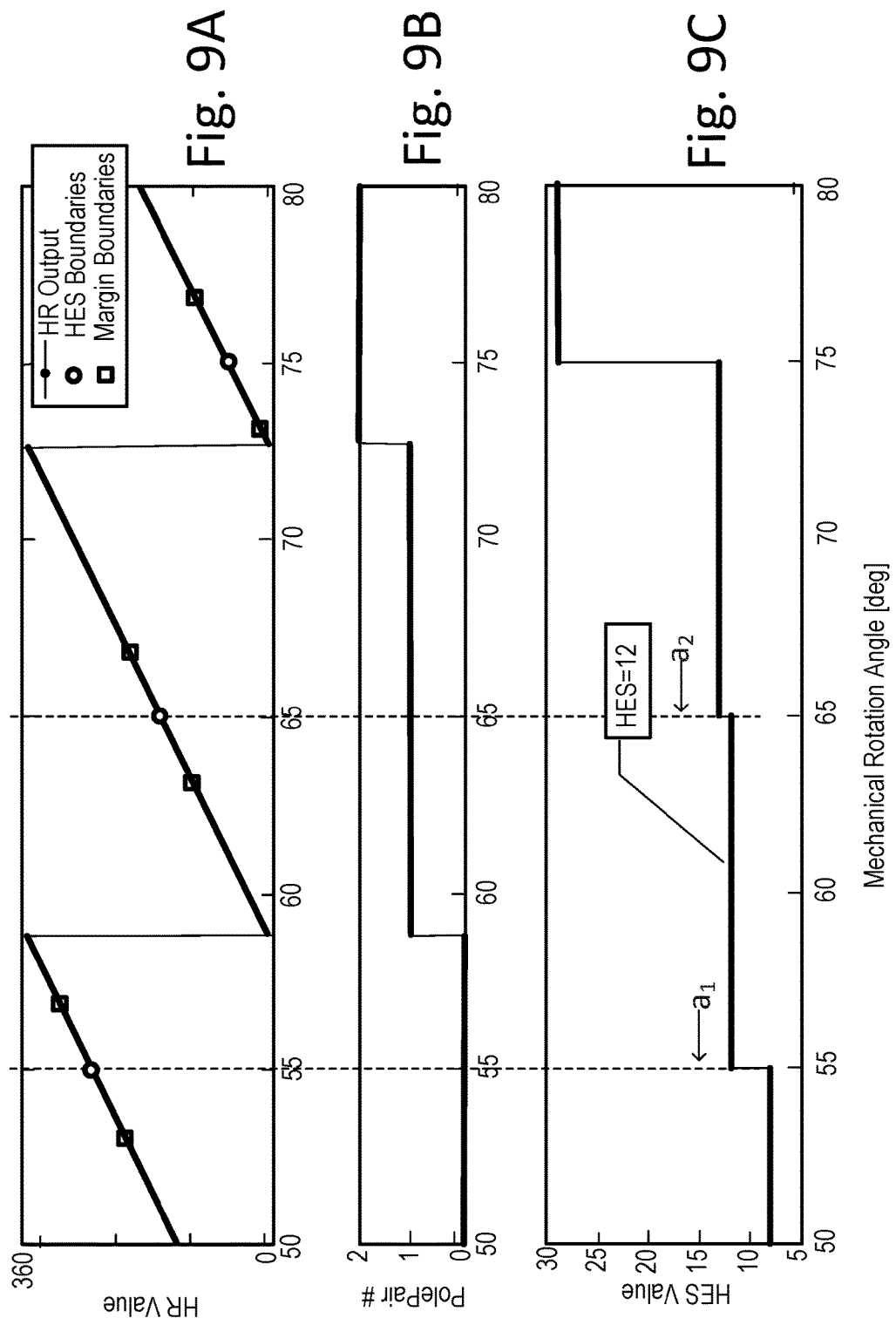

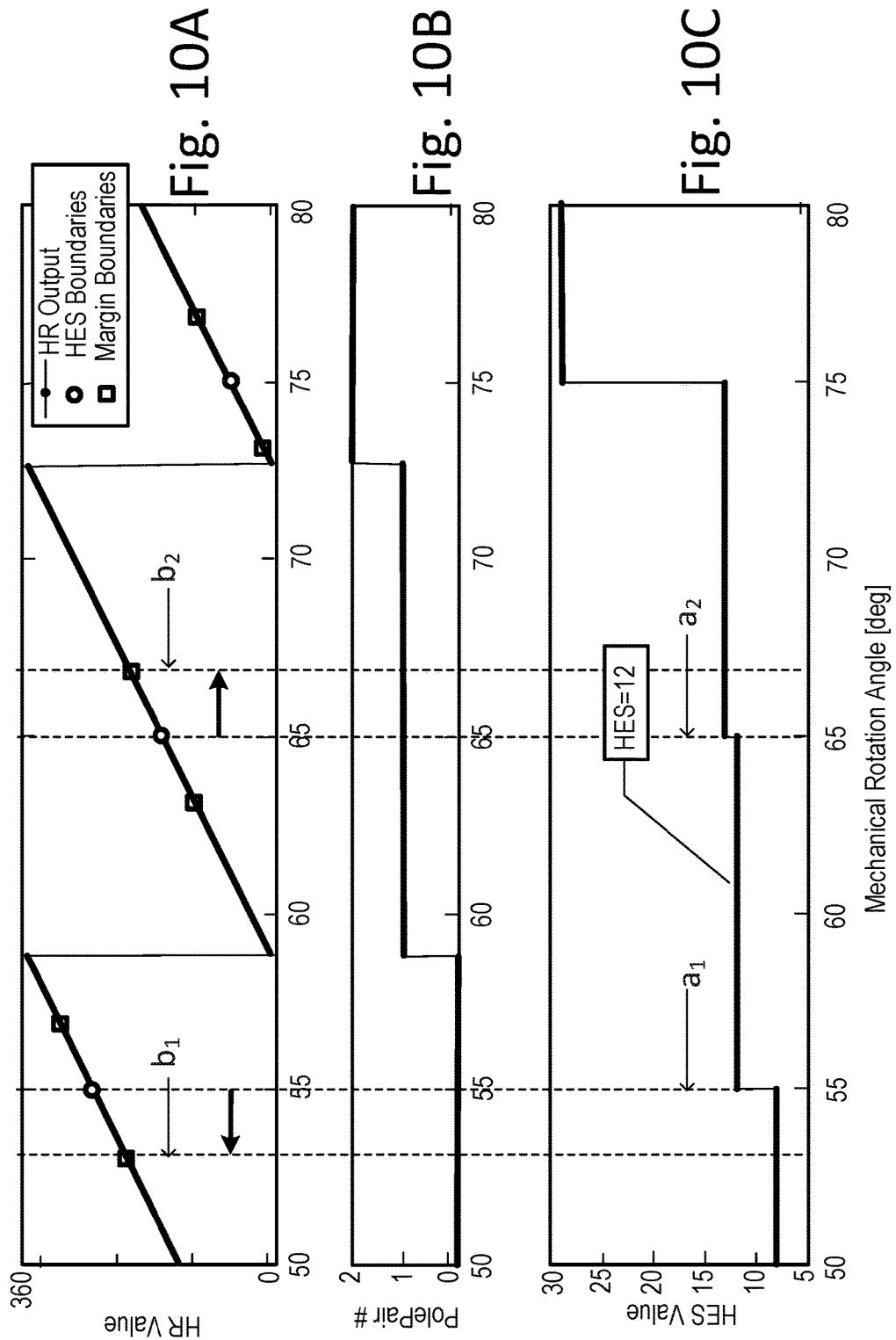

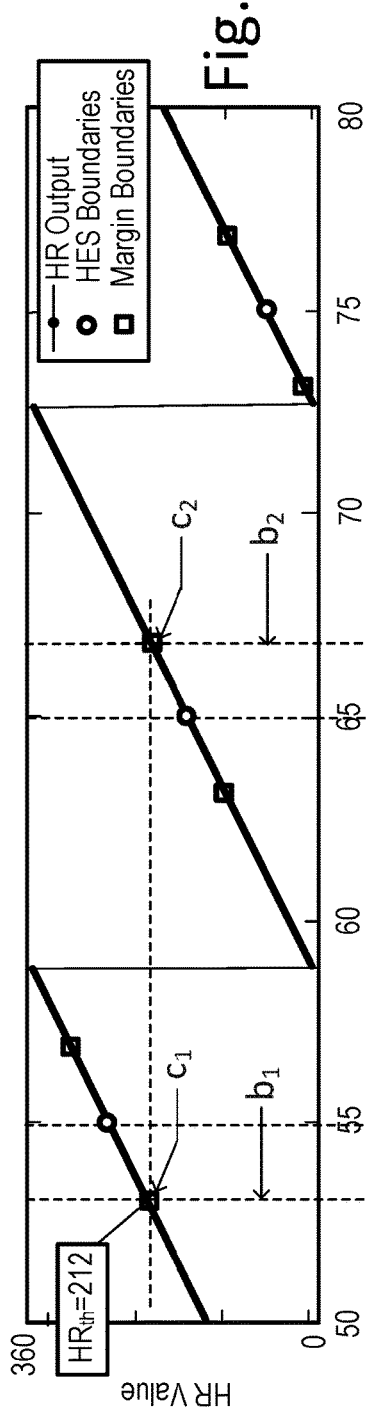
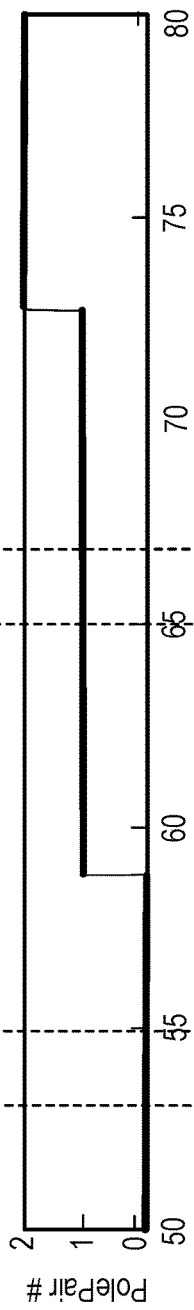
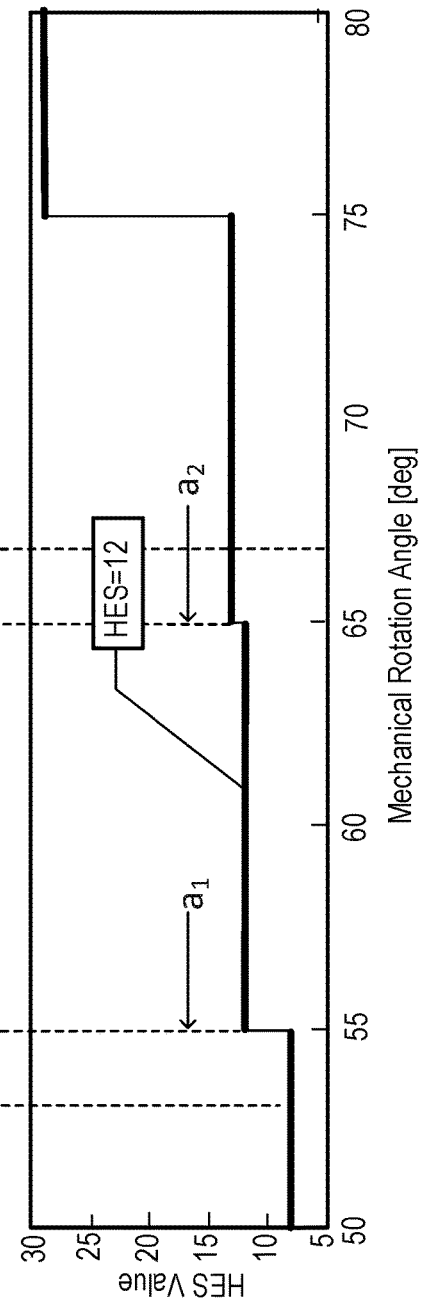
Fig. 11A
Fig. 11B
Fig. 11C

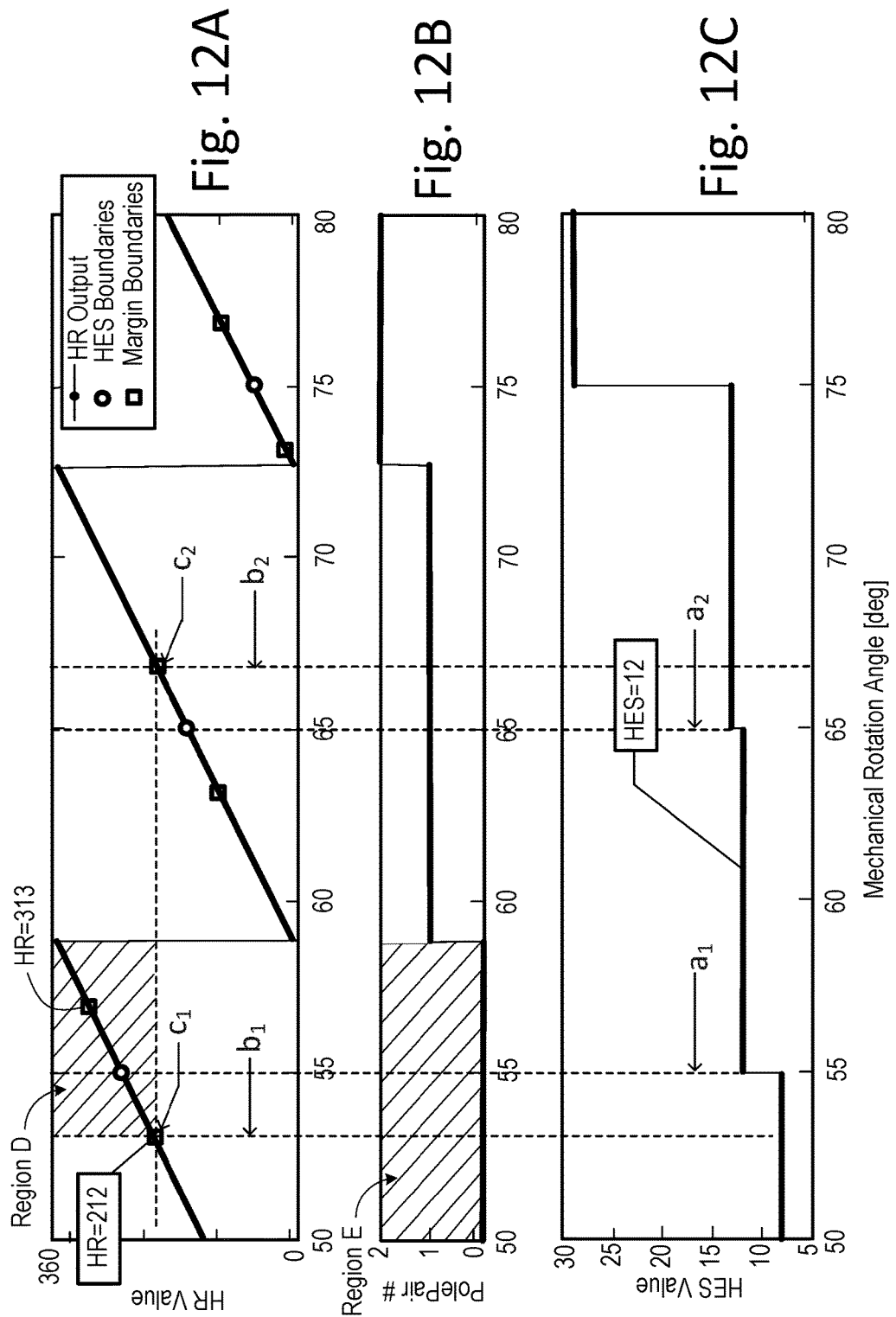

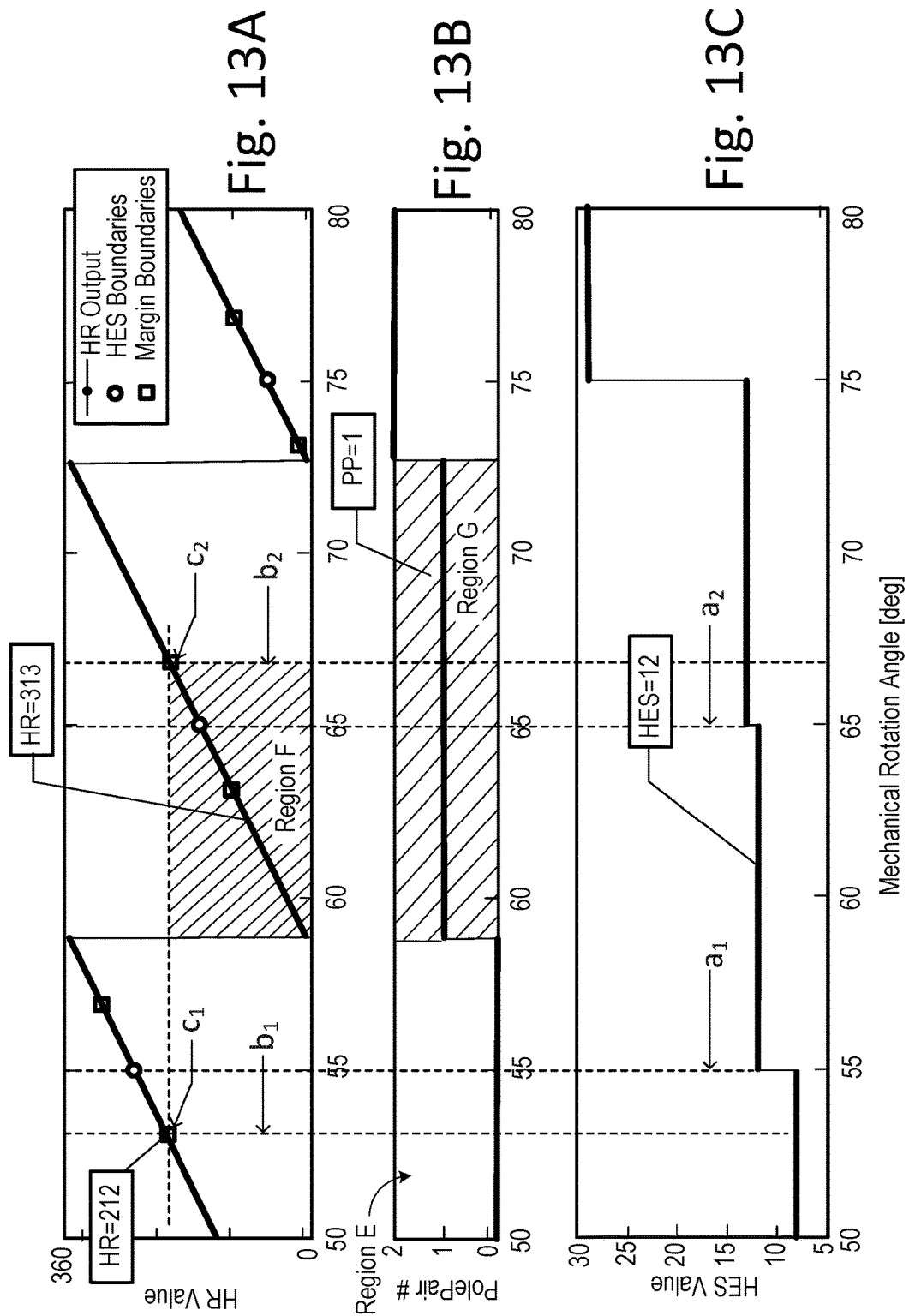

ENCODER FOR A ROTARY MOTOR

TECHNICAL FIELD

This disclosure relates generally to an encoder for a rotary motor.

BACKGROUND

A rotary encoder is an electro-mechanical device that converts the angular position of a shaft or an axle of a rotary motor to an analog or a digital code indicative of the angular position. Encoder feedback may be used to ensure synchronization of motor stator and rotor positions to drive-supplied current.

SUMMARY

Described herein are example systems for converting the angular position of a shaft or an axle of a rotary motor to an analog or a digital code indicative of the angular position. The systems may include a magnetic disk encoded with first magnetic transitions and second magnetic transitions, where the first magnetic transitions are on a first circumference of the magnetic disk, the second magnetic transitions are on a second circumference of the magnetic disk, the first magnetic transitions represent regions on the magnetic disk, and the second magnetic transitions represent locations on the magnetic disk within each of the regions. The systems may include a first sensor to detect a region based on the first magnetic transitions and a second sensor to detect a location based on the second magnetic transitions. The systems may also include a decoder to identify an absolute location on the magnetic disk based on the region detected by the first sensor and the location detected by the second sensor. The systems may include one or more of the following features, either alone or in combination.

In some examples, the first sensor may detect the region and the second sensor may detect the location without rotating the magnetic disk.

In some examples, the first magnetic transitions may comprise a first number of unique asymmetric pole transitions, where the first number corresponds to the number of regions on the first circumference of the magnetic disk. The second magnetic transitions may comprise a second number of pole transitions within the second circumference of the magnetic disk, and the absolute location is based on the first number and the second number.

In some examples, identifying the absolute location may comprise determining a threshold value based on the region detected by the first sensor and a tolerance relative to that region, comparing the second number to the threshold, and determining the absolute location based on the comparing.

In some examples, the second magnetic transitions repeat across the second circumference such that the second magnetic transitions overlap boundaries between regions defined by the first magnetic transitions. Also, the tolerance may be based on an amount of the overlap.

In some examples, the first sensor may include a Hall effect sensor arranged around a circumference of the magnetic disk, and the second sensor may include a line array sensor configured to sense incremental magnetic transitions. Also, the second magnetic transitions may be at a higher resolution than the first magnetic transitions.

In some examples, the first circumference of the magnetic disk is an outer circumference. In some implementations, the second circumference of the magnetic disk is an outer circumference.

In another example, a system for converting the angular position of a shaft or an axle of a rotary motor to an analog or a digital code indicative of the angular position may include the following features: an exoskeleton for supporting a suspended platform relative to a base over a range of travel; a rotary motor to generate a force source for isolating the suspended platform from the base, where the rotary motor has an encoder comprising a magnetic disk encoded with first magnetic transitions and second magnetic transitions, with the first magnetic transitions being on a first circumference of the magnetic disk, and the second magnetic transitions being on a second circumference of the magnetic disk. The first magnetic transitions may represent regions on the magnetic disk, and the second magnetic transitions may represent locations on the magnetic disk within each of the regions. The system may also include a drive mechanism separate from the exoskeleton for applying the force from the rotary actuator between the suspended platform and the base.

In some examples, the rotary motor in the example system may also include a first sensor to detect a region based on the first magnetic transitions, a second sensor to detect a location with the region based on the second magnetic transitions, and a decoder to identify an absolute location on the magnetic disk based on the region detected by the first sensor and the location detected by the second sensors.

In some examples, the first sensor may detect the region and the second sensor may detect the location, without rotating the magnetic disk.

In some examples, the first magnetic transitions may comprise a first number of unique asymmetric pole transitions, where the first number corresponds to the number of regions on the magnetic disk. The second magnetic transitions may comprise a second number of pole transitions within each of the regions, and the absolute location may be based on the first number and the second number.

In some examples, identifying the absolute location may comprise determining a threshold value based on the region detected by the first sensor and a tolerance relative to that region, comparing the second number to the threshold, and determining the absolute location based on the comparing.

In some examples, the second magnetic transitions may repeat across the second circumference such that the second magnetic transitions overlap boundaries between regions defined by the first magnetic transitions. Also, the tolerance may be based on an amount of the overlap.

In some examples, the rotary motor may be offset to a side of the vibration isolation system base and the drive mechanism may be arranged to drive the suspended platform at or near the center of gravity of the suspended platform.

In some other examples, the rotary motor may be inertially coupled to the exoskeleton at a point intermediate between the connection of the exoskeleton to the suspended platform and the connection of the exoskeleton to the base.

In some examples, the first circumference of the magnetic disk is an outer circumference. In some other implementations, the second circumference of the magnetic disk is an outer circumference.

Another example system features an encoder for a rotary motor, where the encoder includes a magnetic disk having encoded thereon coarse transitions and fine transitions. The coarse transitions may define regions of the magnetic disk, and the fine transitions may repeat within each of the regions. The coarse transitions and the fine transitions together may represent absolute positions of the rotary motor that are detectable without rotation of the magnetic disk.

In some examples, the coarse magnetic transitions include a first number of unique asymmetric pole transitions, where the first number may correspond to the number of regions on the magnetic disk. In some examples, the fine magnetic transitions include a second number of pole transitions within each of the regions, and the absolute location may be based on the first number and the second number.

In some examples, the coarse magnetic transitions are at a first circumference of the magnetic disk, and the fine magnetic transitions are at a second circumference of the magnetic disk. The fine magnetic transitions may repeat across the second circumference of the magnetic disk such that the fine magnetic transitions overlap boundaries between regions defined by the coarse magnetic transitions. In some examples, absolute location is based on an amount of the overlap. In some examples, the coarse transitions and the fine transitions may be printed on the magnetic disk.

In some examples, the first circumference of the magnetic disk is an outer circumference. In some examples, the second circumference of the magnetic disk is an outer circumference.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

FIG. 8A is a graph that shows the output of the line array sensor for a range of angular locations around the circumference of the magnetic track.

FIG. 8B is a graph that shows a step plot of magnetic pole pairs for a range of angular locations around the circumference of the magnetic track.

FIG. 8C is a graph that shows the combined output of the Hall effect sensors for a range of angular locations around the circumference of the magnetic track.

FIG. 9A is a graph that shows boundaries for a given Hall effect sensor value on the output of the line array sensor.

FIG. 9B is a graph that shows highlighted boundaries for a given Hall effect sensor value on the step plot of magnetic pole pairs for a range of angular locations around the circumference of the magnetic track.

FIG. 9C is a graph that shows highlighted boundaries for a given Hall effect sensor value on the outputs of the Hall effect sensors for a range of angular locations around the circumference of the magnetic track.

FIG. 10A is a graph that shows the overlap margin and boundaries for a given Hall effect sensor value on the output of the line array sensor.

FIG. 10B is a graph that shows the overlap margin and boundaries for a given Hall effect sensor value on the step plot of magnetic pole pairs for a range of angular locations around the circumference of the magnetic track.

FIG. 10C is a graph that shows the overlap margin and highlighted boundaries for a given Hall effect sensor value on the outputs of the Hall effect sensors for a range of angular locations around the circumference of the magnetic track.

FIG. 11A, FIG. 11B, and FIG. 11C are graphs that show a line array sensor value threshold.

FIG. 12A, FIG. 12B, and FIG. 12C are graphs that illustrate a decoding process to determine an example pole pair over which the line array sensor is located.

FIG. 13A, FIG. 13B, and FIG. 13C are graphs that that illustrate a decoding process to determine another example pole pair over which the line array sensor is located.

DETAILED DESCRIPTION

Described herein are example implementations of an encoder for determining a position of a rotary motor. In some implementations, the encoder is an absolute position encoder, as described herein. Generally, an encoder is an electro-mechanical device that is configured to sense and translate position into analog or digital signals. An encoder can be a linear encoder that senses the position of an armature or moving part of a motor relative to the position of a stator or stationary part of a motor. The encoder may also be a rotary encoder that senses and translates the angular position of a rotary motor into analog or digital signals, which represent the angular position or motion of a shaft or axle in the rotary motor (the angular position of the motor). An absolute position encoder generates analog or digital signals that represent the current position of the shaft or axle of the rotary motor, as opposed to information about the motion of the shaft or axle, which is determined by so-called incremental encoders.

In the example implementations described herein, the encoder is capable of indicating the angular position of the motor when the motor is powered-up, without requiring rotation of motor components, such as the shaft or axle.

Figure 1:
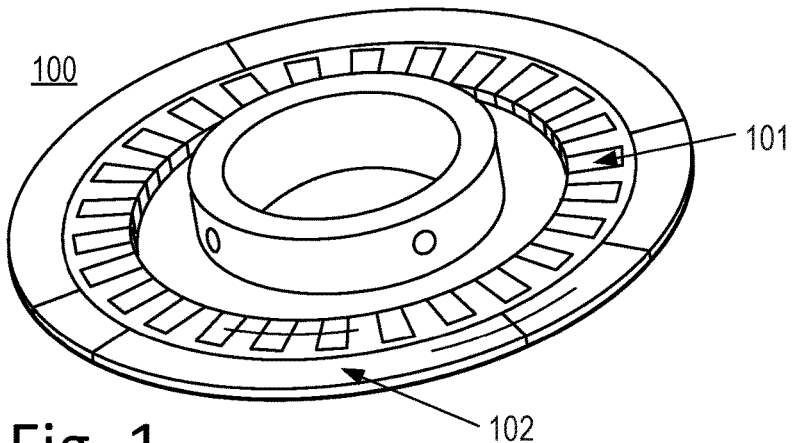
FIG. 1 is a perspective view of an example magnetic target that may be part of the encoder described herein.

The example encoder may include a magnetic target, sensors, and one or more processing devices to perform processing to determine an absolute angular position of the motor based on information sensed from the magnetic target. FIG. 1 shows a perspective view of an example magnetic target 100 that may be part of the encoder described herein. Specifically, FIG. 1 shows a donut-shaped magnetic target 100 having two different tracks—an inner track 101 and an outer track 102. Inner track 101 is formed on an inner circumference of target 100 and outer track 102 is formed on an outer circumference of the target. The inner and outer tracks may be formed at any appropriate relative locations along the target, so long as the inner track is within the circumference of the outer track.

Each track has a pattern of magnetic north and south pole regions formed thereon. The patterns may be formed through printing, molding, embossing, or any other appropriate technique. Furthermore, each track may be made up of discrete magnets. In this example, inner track 101 has an incremental pattern of magnetic north and south poles, and is referred to as a high resolution pattern, while outer track has an asymmetric pattern of north and south poles, and is referred to as a coarse pattern. The outer track enables location resolution to a lesser degree than the inner track; hence the use of "coarse" and "high" resolution to describe the outer and inner tracks, respectively. In an example implementation, the outer track enables resolution to about 10° (out of 360°), whereas the inner track enables resolution to as little as 0.1°. However, these values are only representative of resolutions enabled by the encoder. In other implementations, different coarse and high resolutions are enabled by changing the configurations of the patterns. In some implementations, magnetic target 100 may also have a shape other than a donut-shape (e.g., the target may be disc-shaped).

In some implementations, the configurations of the inner and outer tracks may be inverted so that the inner track 101 has an asymmetric pattern of north and south poles and is referred to as the coarse pattern, while the outer track 102 has an incremental pattern of north and south poles and is referred to as the high resolution pattern. In such implementations, the inner track 101 enables location resolution to a lesser degree than the outer track 102.

Figure 2:
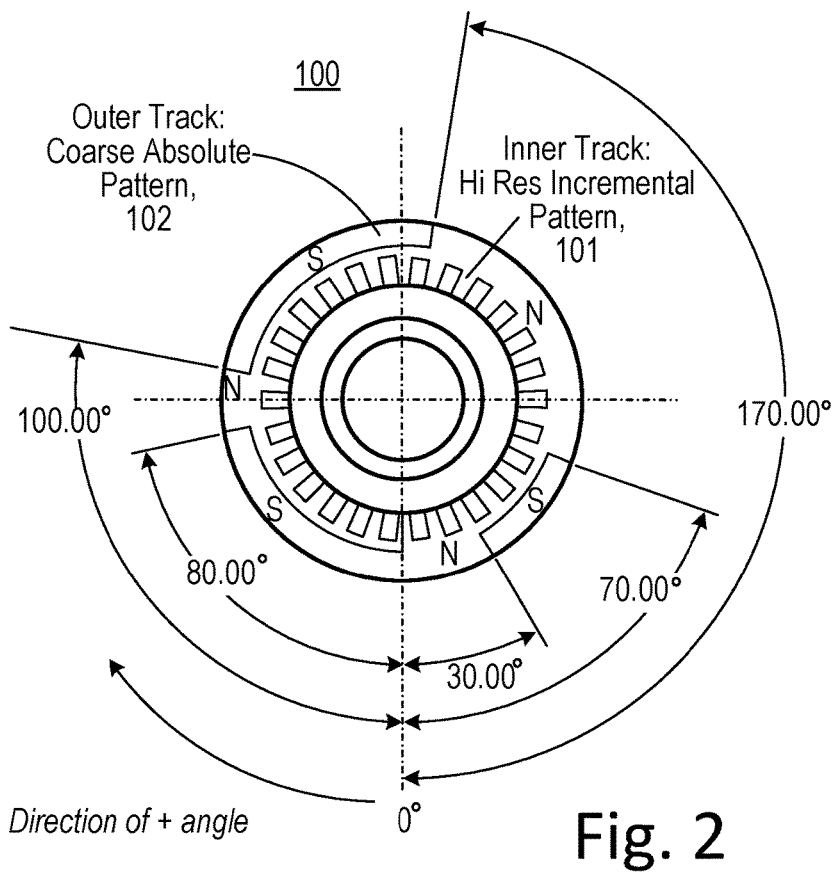
FIG. 2 is a top-view of the example magnetic target.

FIG. 2 shows a top-view of example magnetic target 100. In this implementation, inner track 101 has an incremental pattern of north and south pole regions. Each pole region has a specific width. The widths and the numbers of pole regions are parameters that can affect the precision of the encoder. In this example, the width of the poles is chosen so that the inner track 101 has 26 repeating north-south pole patterns or states. In some examples, the width of the poles of the inner track 101 may be chosen so that the inner track 101 has more or less than the 26 repeating states shown in FIG. 2.

The outer track 102 of the magnetic target 100 may be a single track Gray code. In this example, the outer track has an asymmetric pattern of magnetic north and south regions. For example, from 0° to 80°, outer track 102 is a magnetic south pole region; from 80° to 100° outer track 102 is a magnetic north pole region; from 100° to 190° outer track 102 is a magnetic south pole region; from 190° to 290° outer track 102 is a magnetic north pole region, from 290° to 330° outer track 102 is a magnetic south pole region, and from 330° to 360° outer track 102 is a magnetic north pole region. In some implementations, the outer track 102 may have a different pattern of north and south pole regions than that depicted in FIG. 2. In some implementations, the magnetic target may have more than one outer track 102, and the multiple tracks can be used to achieve coarse location resolution.

In this example, the north-south regions of the outer track represent 36 absolute states, each of 10°. In other examples, outer track 102 may have more or less than 36 absolute states. The number of absolute states on outer track 102 may be greater than the number of incremental states or repeating states in inner track 101 so that there is overlap between the states on both the inner and outer tracks. In the presence of tolerance errors, this overlap of states between the inner and outer tracks allows the encoder to uniquely locate an angular position using magnetic target 100, as described herein. Tolerance errors may include errors in magnetic pole edge locations, magnetic strength, sensor hysteresis, air gap, sensor sensitivity, and so forth.

Figure 3:
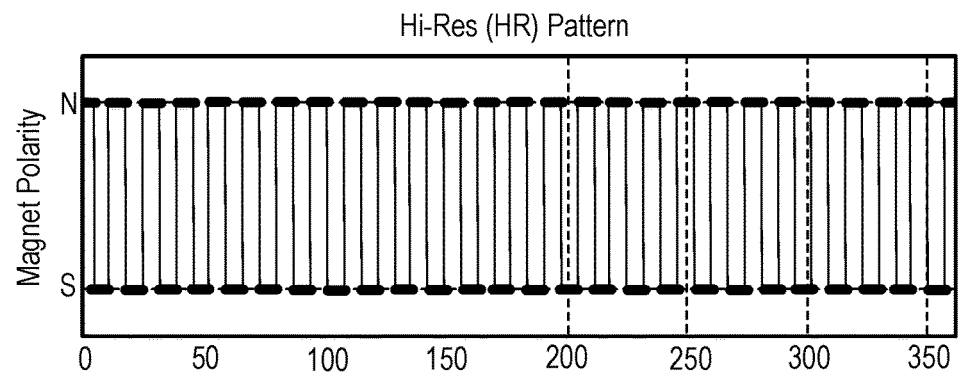
FIG. 3 is a graph that shows changes in magnetic polarity around a circumference of an inner track of the magnetic target.

FIG. 3 is a graph that shows the changes in magnetic polarity between north and south pole regions around the circumference of the inner track of magnetic target 100. Because inner track 101 has an incremental pattern having poles of uniform width, the magnetic polarity alternates uniformly between north and south from 0° to 360° in this example.

Figure 4:
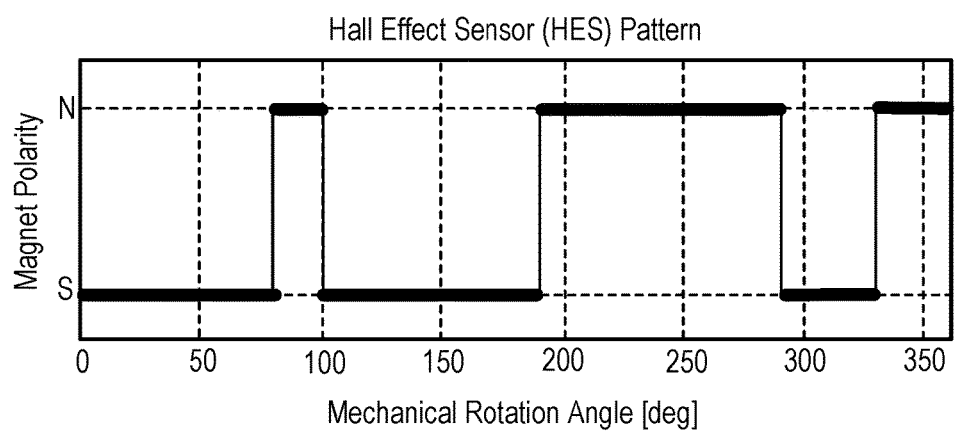
FIG. 4 is a graph that shows changes in magnetic polarity along a circumference of an outer track of the magnetic target.

FIG. 4 is a graph that shows the change in magnetic polarity between north and south pole regions along the circumference of outer track 102. Because outer track 102 has an asymmetric pattern of alternating north and south pole regions, the magnetic polarity alternates asymmetrically between north and south from zero to 360°. For example, the magnetic polarity changes from S-N-S-N-S-N at angles 80°, 100°, 190°, 290°, and 330° that correspond to the change in magnetic polarity along the outer track 102 in FIG. 2. In some examples, the changes in magnetic polarities may occur at different positions along the outer track 102, thereby resulting in a graph that looks different from FIG. 4.

Figure 5:
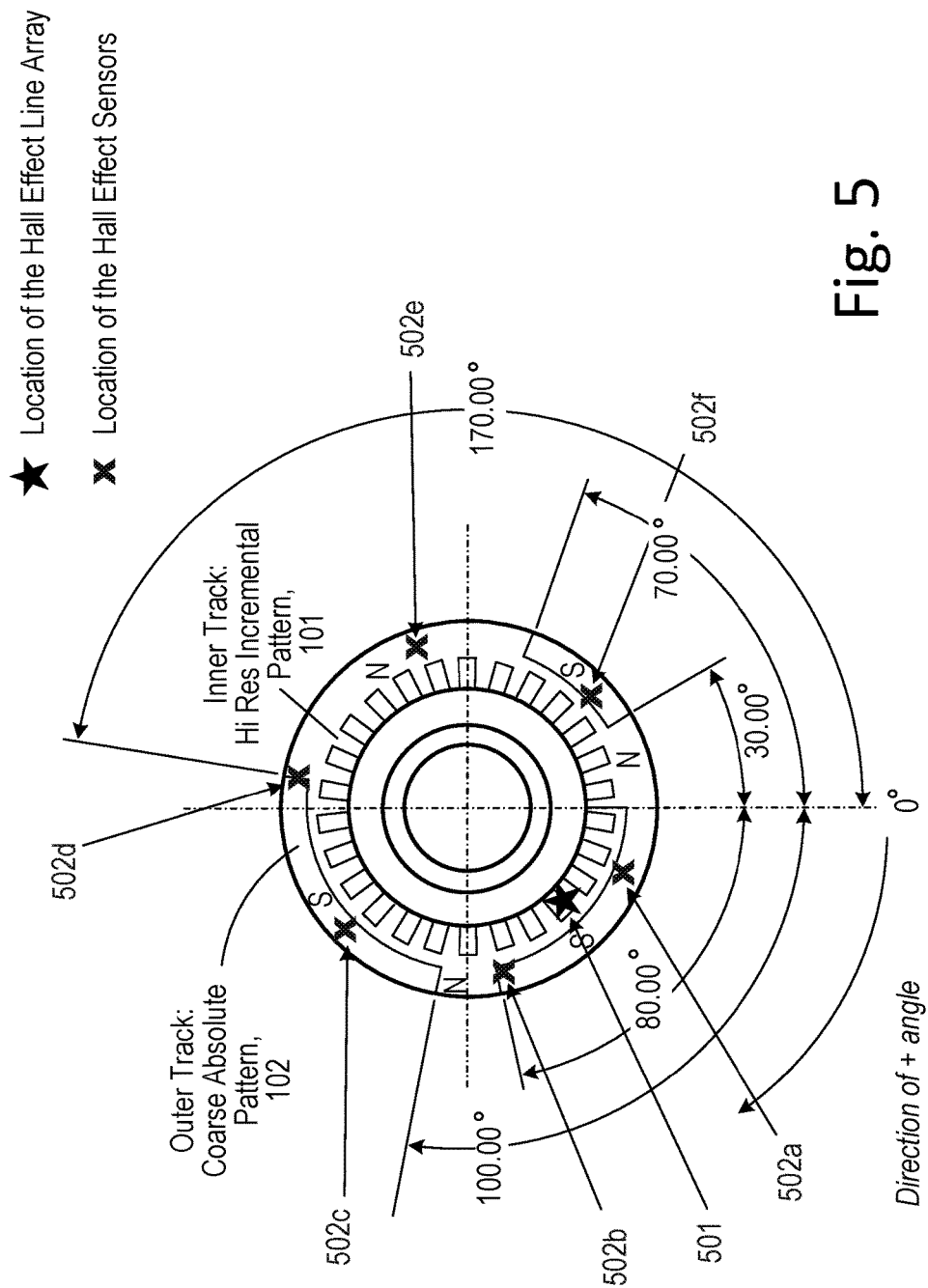
FIG. 5 is a top view of Hall effect and line array sensors of an example encoder that are positioned around the magnetic target.

FIG. 5 shows one or more sensors in the encoder that are positioned around magnetic target 100. In this example, a line array sensor 501, which may be implemented by an application-specific integrated circuit (ASIC), is placed proximate to the inner track, and is configured to detect magnetic state transitions along the inner track. In this example, one line array sensor is used. However, in other implementations, different numbers and/or types of sensors may be used. In this example, Hall effect sensors are placed proximate to outer track 102, and are configured to detect magnetic state transitions along the outer track. In this example, six Hall effect sensors are used. However, in other implementations, different numbers and/or types of sensors may be used.

The line array sensor is configured to sense incremental magnetic state transitions. The line array sensor 501 includes a line array of Hall effect sensors and has a width that enables tracking edges of magnetic transitions or pole-pairs (north/south or south/north) over the inner track of the magnetic target 100. Due to its resolution, the line array sensor is able to identify, to a relatively high resolution (e.g., 1° or less) the location of a magnetic state transition. However, the line array sensor alone is not able to discriminate among pole pairs (e.g., the line array sensor cannot determine which pole-pair of the 26 pole pairs on the high resolution track it is passing over) and thus cannot provide absolute position. For example, when the device is first powered up, one of the pole pairs is over the line array sensor and the line array sensor is able to sense its location within that particular pole pair. However, the line array sensor cannot determine which of the 26 pole pairs it is located over and, therefore, the line array sensor cannot determine its absolute location on the magnetic target.

In this implementation, the line array sensor 501 is configured to generate 26 repeating states for the circumference of the inner track 101 of the magnetic target 100, and to break each repeating state for a pole pair into greater than 100 positions spanning 360° of the incremental pole pair period. Thus, an output value of the line array sensor 501 is a value between 0 and 360 that indicates where, in a particular repeating pattern on the inner track, the sensor is located. The location of the line array sensor 501 over the particular pole pair is the phase offset of the pole pair relative to the line array sensor, and the line array sensor 501 divides the phase (between 0 and 360°) into more than 100 positions or steps. However, as indicated above, the sensor does not know its absolute position because it does not know from which of the repeating patterns on the inner track that the sensor is reading.

In this implementation, Hall effect sensors (502a-502f) are equally spaced around outer track 102 at 60° apart, and are used simultaneously to measure the single track Gray code on outer track 102 and to generate 36 discrete absolute positions or transitions for the circumference of the outer track. As indicated, in some implementations, more or less Hall effect sensors may be used. For example, the number of Hall effect sensors on outer track 102 can be reduced, e.g., to three sensors. In such cases, the magnetic target may have double the number of outer tracks in order to obtain 36 discrete absolute positions. In such cases, the magnetic target would possibly be larger in diameter, however, the cost of using the Hall effect sensors would be decreased by half. Alternatively, the diameter of the magnetic target may be kept constant as the number of Hall effect sensors on the outer track 102 is reduced. In some other examples, the number of Hall effect sensors along outer track 102 can be increased. This would result in even more transitions, e.g., a hundred transitions or discrete absolute positions. The cost of the Hall effect sensors may increase, however.

The spacing of the Hall effect sensors also can be changed to increase or to decrease the number of transitions around outer track 102. In some implementations, however, the number of discrete positions or states of outer track 102 exceeds the number of pole pairs or repeating states on the inner track 101.

In this implementation, the output of the six Hall effect sensors on the outer track 102 make it possible to identify the position of the magnetic target to within 10° of rotation or 1/36th of the circumference of the outer track. The output of the line array sensor on the inner track 101 makes it possible to identify the location with higher precision. Using the information from inner track 101 and outer track 102, the rotary encoder can determine the absolute angular position of the magnetic target to within a predefined precision (e.g., 1° or less in some implementations). In an example, a decoding process, which may be computer-implemented, may use the information obtained from outer track 102 to identify, e.g., within a 10° margin of error, one of the 26 pole pairs. The decoding process may further use the information obtained from inner track 101 to determine the absolute location of the magnetic target 100 within the identified pole pair.

Figure 6A:
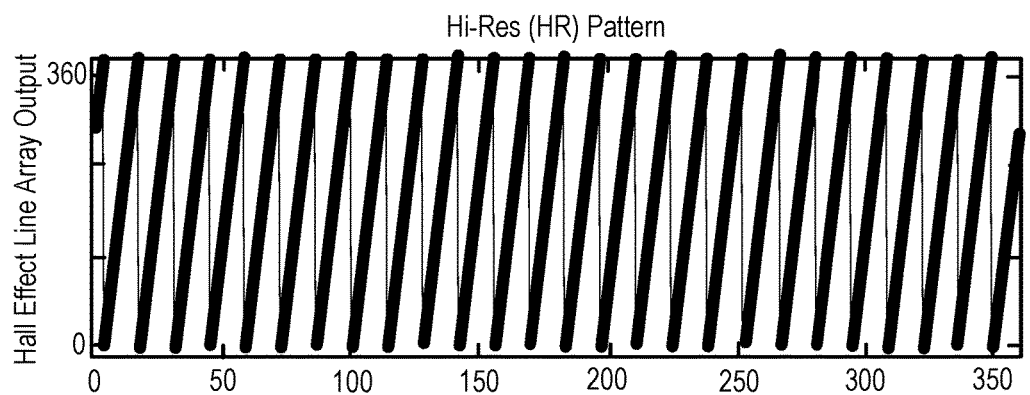
FIG. 6A is a graph that shows output of a line array sensor for the circumference of the inner track.
Figure 6B:
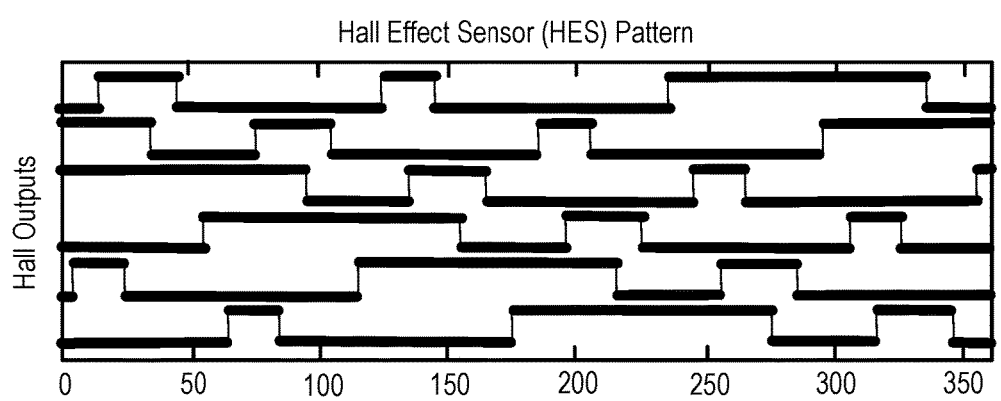
FIG. 6B is a graph that shows outputs of Hall effect sensors along the circumference of the outer track.

FIG. 6A is a graph that shows the output of the line array sensor for the circumference of the inner track 101. In this implementation, for each pole pair transition along inner track 101, the sensor output value ranges from 0 to 360°. These values repeat for each of the 26 pole pairs. FIG. 6B is a graph that shows outputs of Hall effect sensors along the circumference of outer track 102. In this example, there are six Hall effect sensors (502s to 502f), and the output of each sensor is a digital signal. In some implementations, as mentioned above, there may be more than six Hall sensors, with the number of outputs proportional to the number of Hall effect sensors used around the one or more outer tracks.

Figure 7:
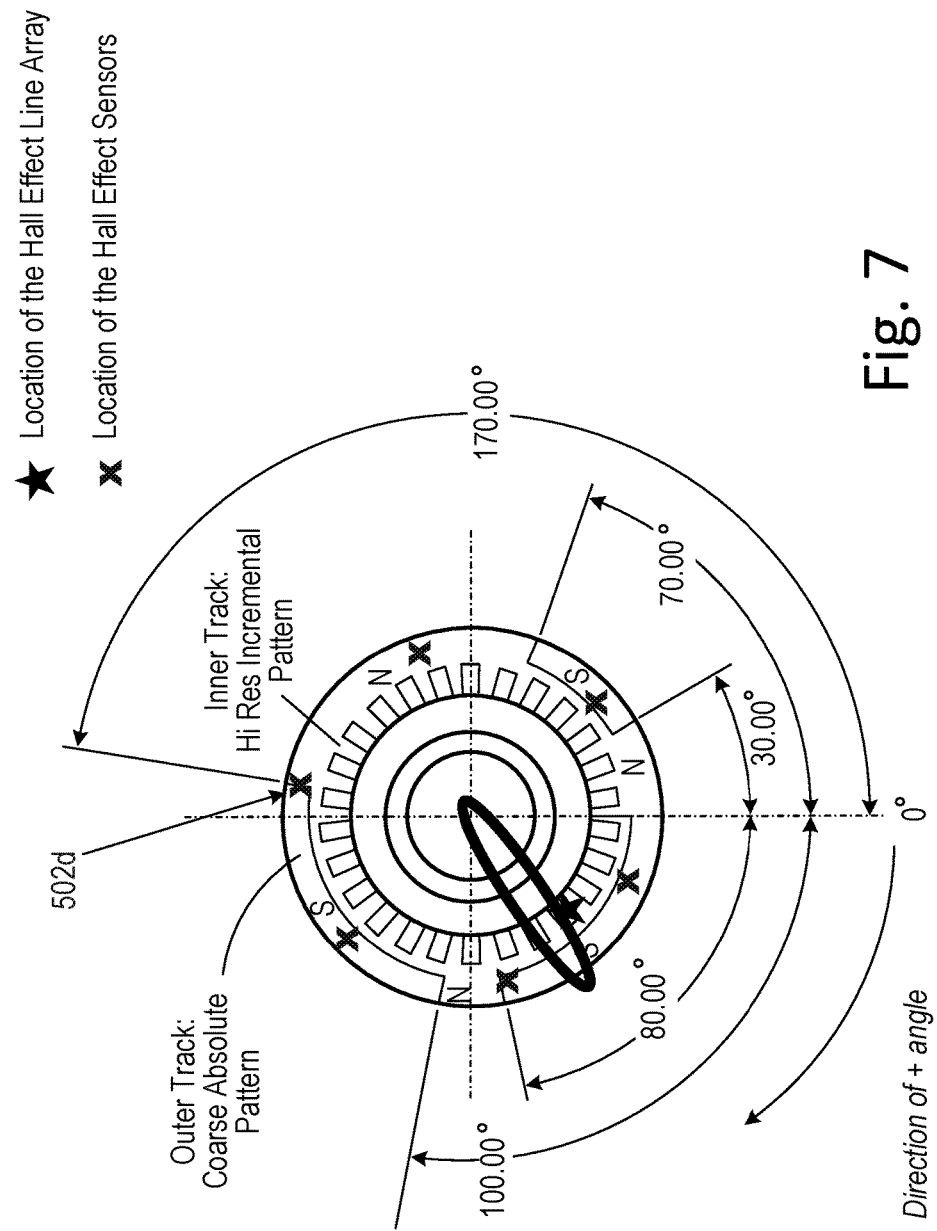
FIG. 7 is a top-view showing example angular locations on the magnetic target.
Figure 7A:
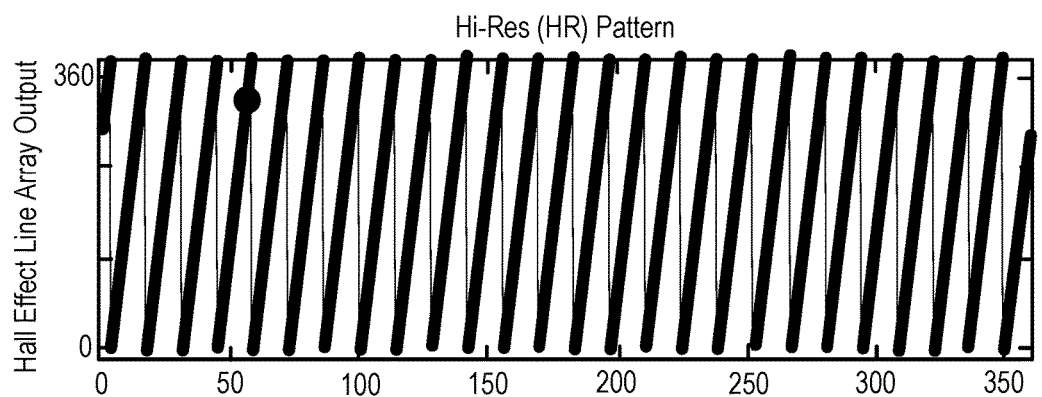
FIG. 7A is a graph that shows the output of a line array sensor for an example angular location.

Decoding combines output of the line array sensor for the inner track and output of the Hall effect sensors for the outer track to determine the absolute angular location on the magnetic target 100. As an example, FIG. 7 shows the highlighted location at 57° on the magnetic target 100. In this example, line array sensor 501 is used to determine a location within the particular pole pair over which it is located, however, line array sensor 501 is unable to detect the position of the particular pole pair. The output of the line array sensor at 57° is shown in FIG. 7A to be 313. This value repeats 26 times in one revolution of the magnetic target 100—one time for each pole pair. Therefore, the value from the line array sensor 501 does not identify the absolute location on the magnetic target.

Figure 7B:
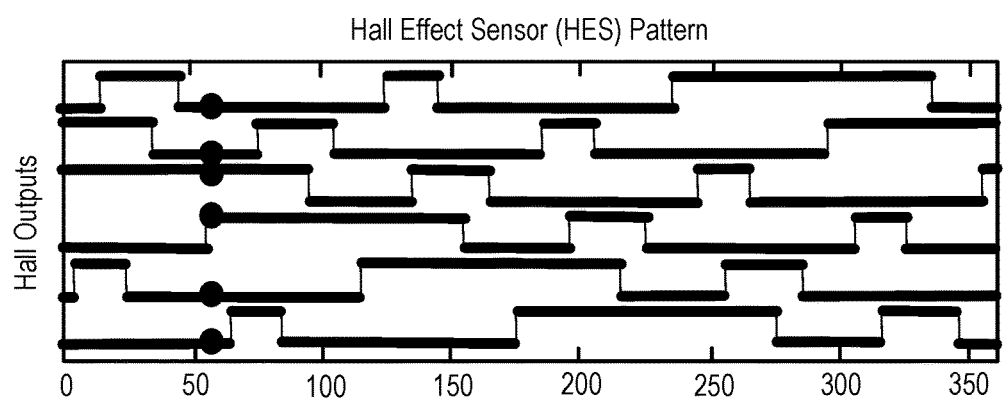
FIG. 7B is a graph that shows outputs of Hall effect sensors along the circumference of the outer track for an example angular location.

As shown in FIG. 7B, Hall effect sensors 502a to 502f around outer track 102 detect transitions that occur along the circumference of outer track 102. Magnetic state transition detection along both the inner and outer tracks may occur during motor operation, and the information detected stored so that, at motor power-up, no further rotation is needed. In this example, the six Hall effect sensors output a binary pattern (a bit from each sensor). For example, at 57°, the outputs of the six Hall effect sensors give the binary pattern 0 0 1 1 0 0, as shown in FIG. 7B. The binary pattern, when transformed to a decimal value, results in the combined Hall value of 12. In some implementations, this type of coding may be different.

FIG. 8A to FIG. 8C are graphs that show the output of line array sensor 501, a step plot of magnetic pole pairs, and the combined output of the Hall effect sensors for angles 50° to 80° around the circumference of the magnetic target.

More specifically, FIG. 8A is obtained by zooming-in on the graph in FIG. 7A, and shows repeating values from 0 to 360° within various pole pair transitions. The repetitions in the graph of FIG. 8A are in phase with the pole-pair transitions in FIG. 8B and, for the entire circumference of the magnetic target, the graph of FIG. 8B would show step increments from 0 to 25 (for the 26 pole pairs). Although FIG. 8B shows that a reading of 313 (at 57°) occurs within pole pair 0, the information about the particular pole pair is unknown because the same reading or value may occur 25 more times within the inner track 101. Thus, the exact pole pair on which the value occurs still needs to be determined using additional information obtained from the outer track 102. In this example implementation, the width of the pole pair transitions in FIG. 8B and the width of the repeating HR values in FIG. 8A are both 13.85° (obtained by dividing 360° by the 26 repeating states).

FIG. 8C shows the combined Hall effect sensor (HES) values for angles 50° to 80°, and highlights the HES value of 12 at 57° (and also for 55° to 65°). The width of the HES value transitions in FIG. 8C is 10°, which can be obtained by dividing 360° by the 36 states of the outer track 102.

FIG. 9A to FIG. 9C show the highlighted boundaries of HES value 12 on the graphs of the line array sensor (HR—"high resolution") value plot, the step plot of pole pairs, and the HES value plot, respectively. The boundaries $a_1$ and $a_2$ (vertical dashed lines) indicate that the HES value of 12 may occur for any angle between 55° and 65° within one target revolution, and the HES value may also occur on pole pair 0 or pole pair 1. Also, the boundaries of the HES value have a width of 10° as described previously.

FIG. 10A to FIG. 10C show the overlap margin and the highlighted boundaries for a HES value of 12 on the graphs of the line array sensor value plot, the step plot of pole pairs, and the HES value plot, respectively. Because the width of the HES value transitions (10°) and the width of the pole pair transitions (13.85°) are different (resulting from the 36 states of outer track 102 and 26 states of inner track 101), in this example there is an overlap margin of 3.85° (approximately 1.9° on each side of the boundaries for each HES value). The boundaries of the overlap margin are indicated by the vertical dashed lines $b_1$ and $b_2$, and the boundaries of the HES value are indicated by the vertical dashed lines $a_1$ and $a_2$. The overlap margin accounts for 38.5% overlap (36 HES states divided by 26 pole pairs) for the circumference of the magnetic target.

FIG. 11A to FIG. 11C show an HR value threshold as determined using the boundaries of the overlap margin (lines $b_1$ and $b_2$). The HR value threshold is the HR value that corresponds to the points ($c_1$ and $c_2$) at which the overlap margin boundaries ($b_1$ and $b_2$) intersect the HR value plot. In some implementations, the HR value threshold is used in a decoding process for determining the particular pole pair on the inner track 30 over which the line array sensor 501 is located. In this example, the HR value threshold is at 212, and is indicated by the horizontal dashed line in FIG. 11A.

FIG. 12A to FIG. 12C show how the HR value threshold is used to determine the particular pole pair over which line array sensor 501 is located using the decoding process described herein. The decoding process uses information about the combined HES value determined from the six Hall sensors 502$a$ to 502$f$, the HR value determined by line array sensor 501, and the HR threshold value to identify the pole pair on the inner track over which the line array sensor is located, and thus the absolute position that is being sensed by the line array sensor.

The following example explains how an encoded absolute position on the magnetic target is decoded given the following sensor measurements:

HES value=12
HR value=313>HR threshold (212)

An HES value of 12 occurs for any angle between 55° and 65° in one target revolution, as indicated by the HES boundary lines $a_1$ and $a_2$ in FIG. 12C. FIG. 12B shows that pole pair 0 and pole pair 0 are the only two pole pairs that lie within the HES boundary lines $a_1$ and $a_2$, therefore, the angular location of the magnetic target 100 is on either pole pair 0 or pole pair 1. Region D in FIG. 12A indicates HR values greater than the HR threshold (212) for angles within the boundaries of the overlap margin ($b_1$ and $b_2$). Therefore, to simultaneously obtain an HES value of 12 and an HR value of 313 (greater than the HR threshold), the position of the magnetic target 100 must be within the pole pair in region E of FIG. 12B, pole pair 0. Thus, it is possible to determine the absolute position (pole pair number and the location within the pole pair) of the magnetic target 100. In this example, the magnetic target 100 is located at position 313 within pole pair 0 in the inner track 101.

The following additional example explains how an encoded absolute position on the magnetic target is decoded given the following sensor measurements:

HES value=12
HR value=113 (or any value lower than the HR threshold of 212)

An HES value of 12 occurs for any angle between 55° and 65° in one target revolution, as indicated by the HES boundary lines $a_1$ and $a_2$ in FIG. 13C. FIG. 13B shows that pole pair 0 and pole pair 1 are the only two pole pairs that lie within the HES boundary lines $a_1$ and $a_2$, therefore, the angular location of the magnetic target 100 is on either pole pair 0 or pole pair 1. Region F in FIG. 13A indicates HR values less than the HR threshold (212) for angles within the boundaries of the overlap margin ($b_1$ and $b_2$). Therefore, to simultaneously obtain an HES value of 12 and an HR value of 113 (less than the HR threshold), the position of the magnetic target 100 must be within the pole pair in region G of FIG. 13B, pole pair 1. Thus, it is possible to determine the absolute position (pole pair number and the location within the pole pair) of the magnetic target 100. In this example, the magnetic target 100 is located at position 113 within pole pair 1 in the inner track 101.

The error margin or overlap margin is taken into account in the design of the encoder. In this example, the magnetic target 100 is configured so that the inner track 101 has 26 repeating states and the outer track 102 has 36 states. Because the outer track 102 has 36 states, the width of the transitions in the outer track is 10° (360°/36). Thus, the outer track enables location resolution of the magnetic target 100 to 10°. For the inner track 101, each pole pair width is 13.85° (360°/26), and each of the pole pairs can be divided into >100 positions spanning 360° of the incremental pole pair period. Therefore, in 1 revolution, the inner track 101 enables location resolution of the magnetic target 100 to within 0.1° (ex: 13.85°/139, if each pole pair is divided into 139 positions). In other implementations, different resolutions are enabled for the inner track 101 and the outer track 102 by changing the configurations of the patterns. Furthermore, there is an overlap of) 3.85° (13.85°-10° that occurs as a result of the 36 states in the outer track 102 and the 26 repeating states in the inner track 101.

The decoding process described above can be performed for all the possible HES values and used to create a look-up table (LUT). A portion of an example LUT is shown below.

| Index (k) | HES value (dec_HES) | HR threshold (dec_HRth) | Pole-Pair Number (dec_N) |
|---|---|---|---|
| 0 | 24 | 90 | 22 |
| 1 | 26 | 351 | 22 |
| 2 | 58 | 252 | 23 |
| 3 | 56 | 151 | 24 |
| 4 | 40 | 52 | 25 |
| 5 | 8 | 311 | 25 |
| 6 | 12 | 212 | 0 |
| 7 | 13 | 110 | 1 |
| 8 | 29 | 11 | 2 |
| 9 | 18 | 270 | 2 |

Figure 14:
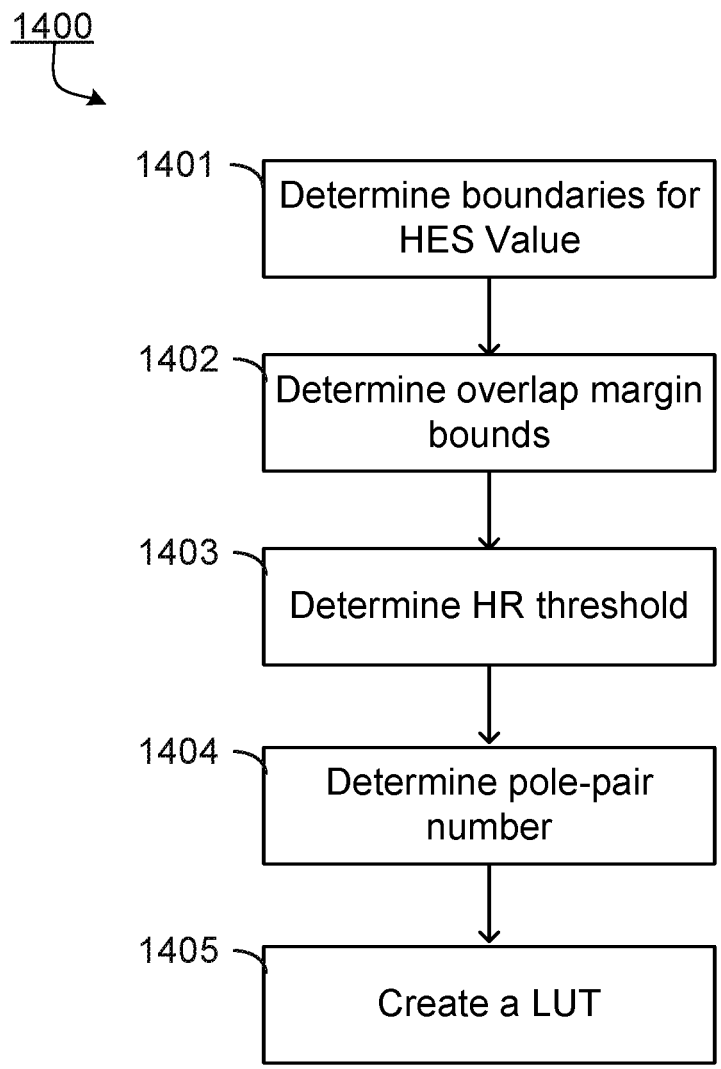
FIG. 14 is a flowchart showing an example process for determining the absolute position of a rotary motor.

FIG. 14 shows a flowchart of an example process 1400 that may be used to determine the absolute position of a rotary motor according to the processes described herein. In some implementations, process 1400 may be initiated when an HR value is measured from the line array sensor 501 along the inner track 101 and an HES value is determined from measurements of the Hall effect sensors 502$a$ to 502$f$ around the outer track 102.

According to process 1400, boundaries are determined for the HES value (1401). For example, the boundaries for a given HES value may indicate that the HES value occurs for a range of angles around the circumference of a magnetic target used with a rotary motor. The width of the boundaries of the HES value may be determined by dividing 360° (the circumference) by the number of discrete transitions along outer track 102. In some examples, the number of transitions is 36, resulting in a boundary width of 10°. In other examples, the number of transitions the outer track 102 may be more or less than 36.

Overlap margins may be determined (1402). The overlap margins may be determined based on the number of transition states in outer track 102 and inner track 101. In this example, there are 26 repeating states on inner track 101. Therefore, the width of the pole pair transitions may be obtained by dividing 360° by 26 to obtain a value of 13.85°. The difference in the width of the HES value transitions (10°) and the width of the pole pair transitions (13.85°) causes an overlap margin of 3.85° in this example (approximately 1.9° on each side of the boundaries for each HES value). The overlap margin thus accounts for 38.5% overlap (36 HES states divided by 26 pole pairs) in the circumference of the magnetic target. In some implementations, the overlap margin may be a different value.

According to process 1400, a HR threshold value may be determined (1403). In some implementations, the HR threshold value may be determined by identifying points of intersection between boundaries of the overlap margin and the HR value plot obtained as the output from line array sensor 501.

According to process 1400, a pole pair number may be determined (1404). In some examples, the pole pair number is determined by using a combination of the HR threshold value, the combined HES value from the Hall sensors, and the HR value measured by line array sensor 501.

According to process 1400, a look-up table (LUT) may be created (1405). In some examples, the LUT may include columns for the possible HES values, their corresponding HR threshold values, and pole pair numbers that identify specific pole pairs in the inner track 101. In some examples, the LUT may include other additional information that may be useful in implementing a decoder logic.

In some implementations, the LUT may be created once using the operations of process 1400. The entries of the LUT may then be used with a decoder logic to determine the absolute position of the magnetic target 100 using readings from the line array sensor 501 at the inner track and the Hall effect sensors at the outer track, as described in more detail with respect to FIG. 15

Figure 15:
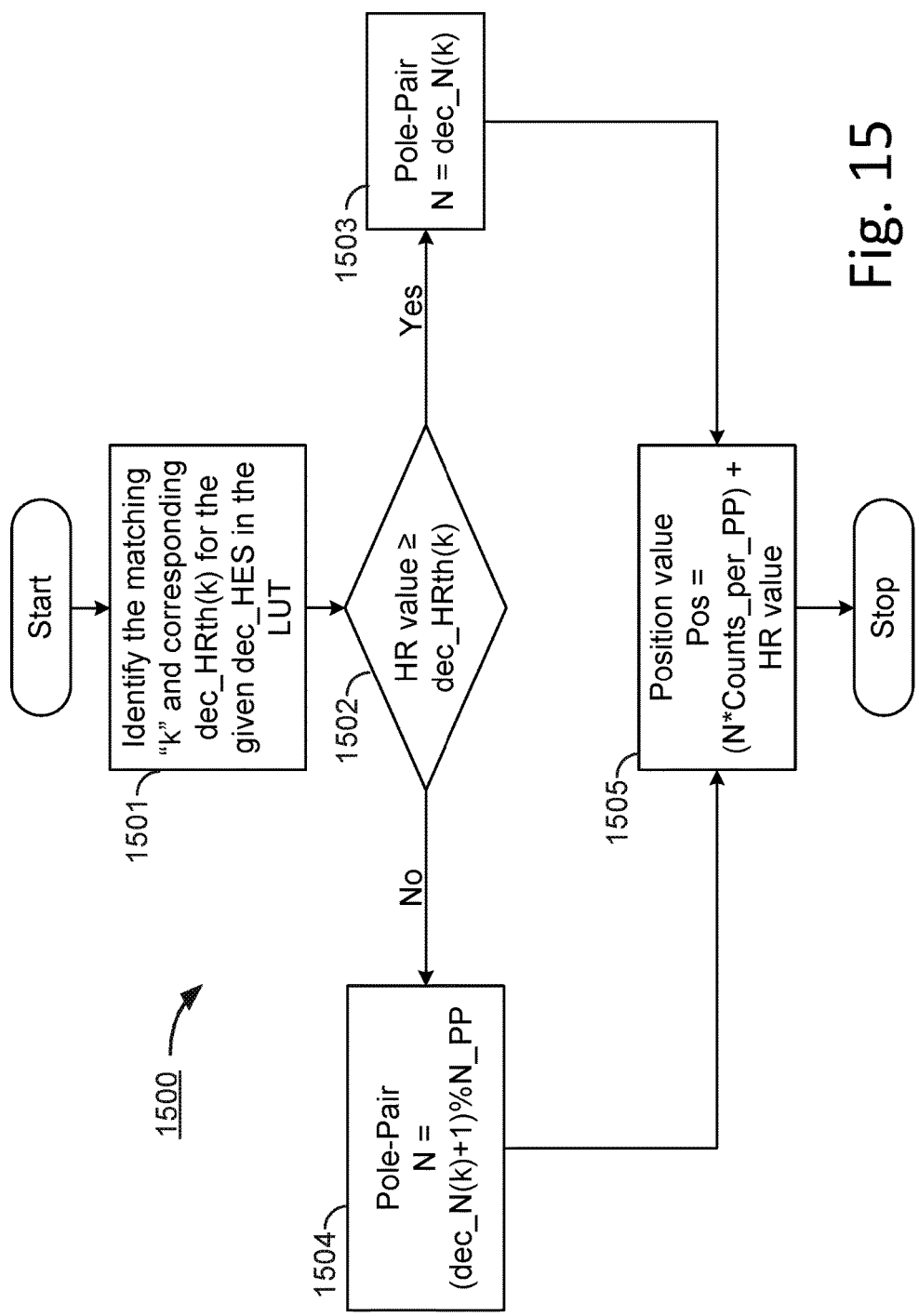
FIG. 15 is a flowchart showing an example process for decoding information obtained from the sensors to determine the absolute position of the rotary motor.

FIG. 15 shows a flowchart of an example process 1500 to decode information obtained from the sensors to determine the absolute position of the shaft or axle of a rotary motor. In some implementations, process 1500 may be initiated when an HES value is determined from measurements of the Hall effect sensors 502a to 502f around outer track 102 and an HR value is measured by line array sensor 501 along inner track 101. For example, given that outer track 102 has 36 different states, one of the 36 possible HES values in the LUT may be determined and used with an HR value to find the absolute position on the magnetic target 100.

According to process 1500, a matching index value (k) and corresponding HR threshold value are identified for a given HES value (1501). For example, given an HES value of 12, the matching index value, k, as read from the LUT is 6, and the corresponding HR threshold value is 212.

The HR value measured by the encoder ASIC 501 is compared with the HR threshold value to determine whether or not the HR value is greater than or equal to the HR threshold at the matching index "k" (1502). In this example, if the HR value is measured as 313, given that the corresponding HR threshold value at k of 6 has been identified as 212, the output of the comparison leads process 1500 to determine the pole pair at step 1503. Alternatively, if the HR value is lower than the HR threshold, process 1500 proceeds to determine the pole pair at step 1504.

According to process 1500 the pole pair number "N" is determined (1503) for an HR value that is above or equal to the HR threshold for a given index "k". In this implementation, for an HR value above the HR threshold, the pole pair is identified as the corresponding pole pair number in the LUT for the index "k". Continuing the example above, pole pair number 0 is identified as the pole pair, given an HES value of 12 and an HR value of 313.

According to process 1500 the pole pair "N" is determined (1504) for an HR value that is below the HR threshold for a given index "k". In this implementation, for an HR value below the HR threshold, the pole pair is determined as the next pole pair modulo the number of pole pairs (N_PP). The modulo operator is used to wrap around the pole pair count and ensure that the maximum number of pole pairs is not exceeded. For example, for HR value=113 and HES value=12, the HR value is below the HR threshold value of 212. Given 26 pole pair transitions (N_PP) in the inner track 101 of the magnetic target 100, the pole pair number "N" may be determined using the expression below.

$$N=(dec\_N(k)+1)\% \ N\_PP$$

$$N=(0+1)\%26$$

$$N=1$$

Decoder logic is then used to determine the absolute angular position value (1505) of the magnetic target 100. In some implementations, the output (Pos) of the decoder is determined using the expression below.

$$Pos[degs]=(N*Degrees\_per\_PP)+ HR\_value*Degrees\_per\_PP/360$$

For example, to determine the absolute angular position value in the previous examples, given Degrees_per_PP=13.85:

For N=0 and HR value=313

$$Pos=(0*13.85)+313*13.85/360=12$$

For N=1 and HR value=113

$$Pos=(1*13.85)+113*13.85/360=18.2$$

The absolute position encoder for determining a position of a rotary motor and the decoder logic for determining absolute position can be used in an active vibration isolation system as described herein. In the active vibration system, a rotary actuator can be used to generate a force for isolating a suspended platform or plant (e.g., a vehicle seat) on which a payload resides from a vibration input applied to a base to which the vibration system is coupled. The rotary actuator force source may be coupled in the active vibration isolation system directly between a plant to be isolated and the base to which the vibration input is applied, and the rotary actuator may comprise a position encoder and a decoder system for absolute position sensing.

An active vibration isolation system will be described in terms of providing isolation to a plant (which will encompass a suspended platform on which a payload resides, but may encompass other elements also) from a vibration input applied to a base to which the vibration isolation system is coupled. The active vibration system applies controlled forces between the base and suspended platform in order to provide vibration isolation to the suspended platform on which the payload resides. In some implementations, the active vibration system can be applied to a vehicle seat. However, it should be understood that the vibration isolation systems are not limited to application in a vehicle seat. Any application in which it is desired to isolate a payload from some vibration input is contemplated herein.

The isolated plant encompasses the entire structure that is isolated from the input vibration. In the case of an active seat, the seat top frame, cushions, armrests, etc. are all part of the suspended plant. Additionally, an occupant of the actively suspended seat will also become part of the plant (since it is the occupant we are most interested in isolating, in this example the occupant would be the payload).

Figure 16:
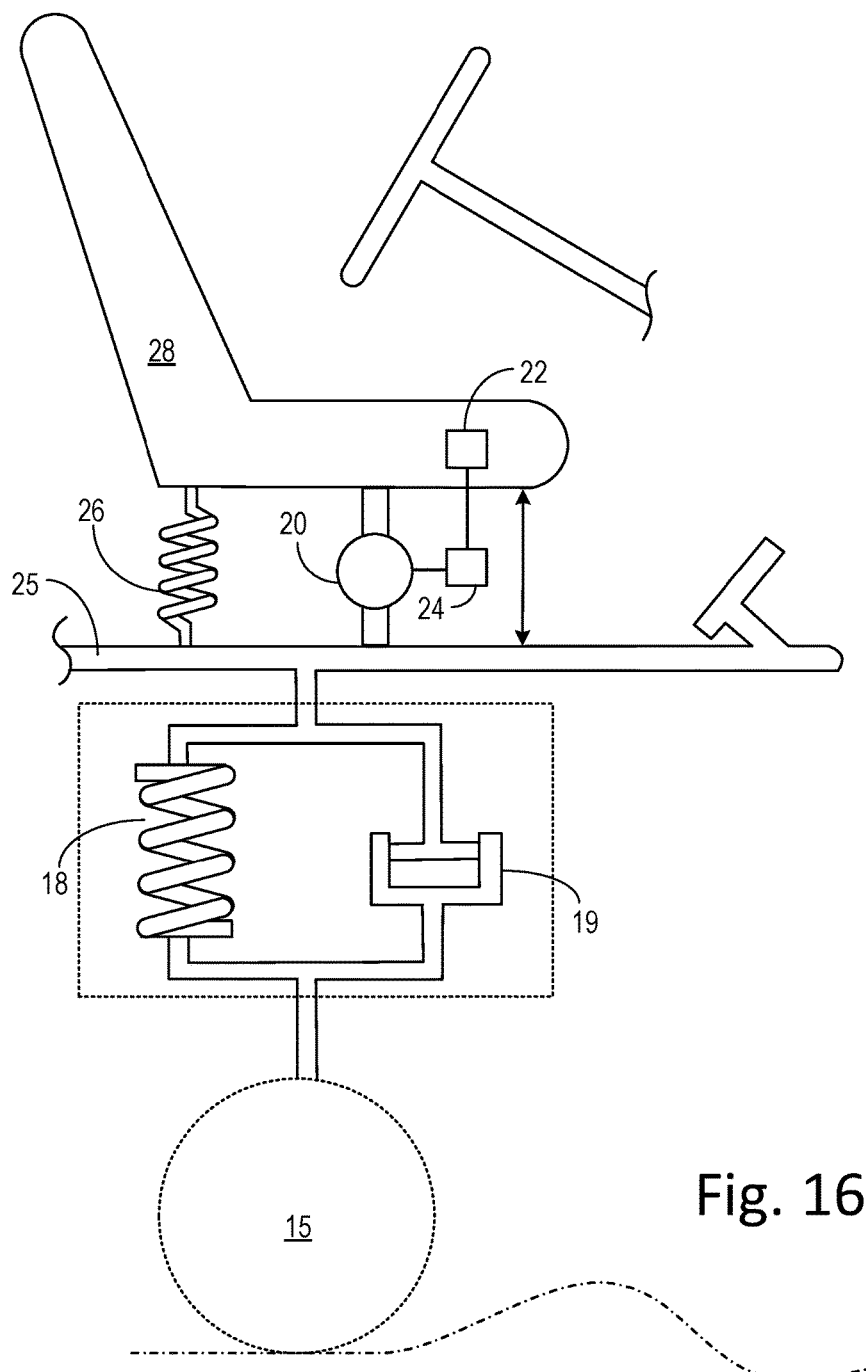
FIG. 16 is a diagrammatic view of an example of an active vibration system that uses the encoder and decoder described herein.

In FIG. 16, suspension 12 is an active seat suspension including a force source 20, a sensor 22, and a controller 24. Some active suspensions may have multiple sensors, and possibly even multiple force sources. The suspension 12 may also have a spring 26 to support the static weight of the seat 28. Spring 26 may be a variable spring with a controllable spring constant or be a spring with provision to apply a controllable pre-load. In the example of FIG. 16, the force source 20 is inertially coupled to the vehicle floor 25.

In operation, vehicle wheel 15 traverses disturbances as it traverses a path. The disturbances along the path cause forces to be applied to the vehicle wheel, which are in turn communicated to the vehicle floor 25 through vehicle suspension spring 18 and damper 19. The vehicle body which rests upon vehicle suspension elements 18 and 19 (note that only one wheel of a vehicle is shown) is typically referred to as the sprung mass, and the mass of the wheel assembly is typically referred to as the unsprung mass. Motion of the unsprung mass imparts forces into the suspension elements which in turn imparts forces into the sprung mass. Seat suspension 12 is used to isolate seat 28 from motion of the sprung vehicle mass.

Sensor 22 detects a quantity related to vertical motion of the seat 28 (such as vertical acceleration, vertical displacement, or vertical velocity). The output of sensor 22 (and other sensors if present) is/are provided as input data to the controller 24. Based on the data supplied to it, the controller 24 determines what output force should be exerted by the force source 20 in order to control motion of the seat 28, and controller 24 issues commands that cause force source 20 to exert the needed force. The above explanation is a simplified discussion of the functioning of an active closed loop vibration control system. An active, closed loop vibration control system suitable for use as seat suspension 12 is described in detail in U.S. Pat. No. 7,983,813, "Active Suspending", to Umethala et al., which is herein incorporated by reference in its entirety.

In U.S. Pat. No. 7,983,813, the force source 20 disclosed was a linear actuator with a moving magnet armature. In some applications, a linear actuator may not be the optimal choice. For example, for the same amount of travel required, it may be desirable to employ a force source that can fit within a smaller physical envelope than a linear actuator can fit within. Additionally, in applications where high efficiency and/or compactness are desired, a rotary actuator may be a better choice. In a linear actuator, portions of the linear actuator armature that extend outside of the stator envelope do not contribute significantly to the force output of the actuator.

Embodiments disclosed herein employ a rotary actuator to generate a force for isolating the suspended platform. The rotary actuator includes a rotary motor and encoder/decoder of the type described herein. Use of conventional transmission mechanisms such as ball nuts and ball screws, planetary gear heads, etc. has been avoided. Such conventional transmissions can provide the useful benefit of allowing the size of a motor for a particular application to be reduced by introducing a motion ratio where multiple revolutions of the motor are translated into a different number of revolutions of the transmission output (generally more revolutions of the motor are transformed into fewer rotations of the transmission output to provide a force amplification factor allowing the motor size to be reduced for a desired output force). However, it is desirable to position a motion sensor near the point at which the force is applied to the controlled element (i.e. the suspended platform which is part of the suspended plant). The presence of a transmission separates the point of application of the force output of the force source from the suspended platform to be controlled (the transmission is disposed between the force source and the suspended platform portion of the plant). Any irregularities in the transmission, such as backlash, slippage, friction, and the like, may introduce the possibility of instabilities in the control loop.

It is desirable for there to be as direct a coupling as practical between the force source output and the suspended plant, in at least the degree of freedom of motion the vibration isolation system is arranged to control. More specifically, it is desirable to avoid routing the primary force output from the vibration isolation system through a secondary support structure such as an exoskeleton before it is applied to the suspended plant. We will refer to coupling a rotary actuator force source 20 in an active vibration isolation system directly between a plant to be isolated and an isolation system base such that it is not routed through an exoskeleton, in the controlled motion degree of freedom, as direct drive. Mechanisms used to provide direct drive coupling will be referred to as direct drive mechanisms. Some examples of direct drive mechanisms are pivoting links and/or cam/follower structures.

In some embodiments, the direct drive mechanism employs pivoting links to transmit force from the force source to plant (and/or between the force source and the vibration isolation system base). In general, the angular displacement of the pivoting link relative to the location on the force source where it couples will be relatively large. Coupling the link to the force source will preferably be accomplished using a rotary bearing that does not constrain relative rotation of the link end relative to its connection location to the force source, but does constrain translation of the link relative to its connection location to the force source.

In general, the angular displacement of the link end that connects to the suspended plant and/or to the vibration isolation system base sees less angular displacement relative to its respective connection location to the plant (and/or to the mechanical ground) than the first link connection point sees relative to the force source connection location. In some embodiments, this connection of the pivoting link to the plant (and/or the vibration isolation system base) is accomplished with a rotary bearing also, as the first connection point to the force source is accomplished. In some embodiment, since the relative angular displacement requirements are lessened, the rotary bearing can be replaced by a rotationally compliant elastomeric bushing or a flexure. The bushing or flexure should be rotationally compliant to allow the required angular displacement of the link end relative to the plant (and/or the vibration isolation system base) connection point, while substantially constraining translation of the link end relative to its connection point location to the plant (and/or to the vibration isolation system base).

The direct drive mechanisms described above employ elements to connect the link ends to the force source and to the plant and/or vibration isolation system base as needed that allow the required relative rotation of the link ends to their respective connection points to the force source, plant and/or vibration isolation system base, while constraining translation motion of the link ends relative to their respective connection points. Rotary bearings, rotationally compliant bushings, flexures, or any other known mechanism that can accommodate the necessary relative rotation while substantially constraining relative translation motion can be used as part of the direct drive mechanism, and the disclosure herein is not limited to the use of any particular connection mechanism.

In some implementations, both a drive mechanism and a separate support mechanism (which will be referred to also as an exoskeleton) are used. There are a number of benefits to such an arrangement. As described earlier, the drive mechanism is configured such that it directly couples the force output from the rotary actuator to the suspended platform (in the general case, the coupling is from the rotary actuator to the plant. In the example of an actively suspended seat, the coupling is between the rotary actuator and the frame of the seat top, or to a platform to which the seat top frame is mounted). A motion sensor can be located on the suspended platform at or near the location the force output of the force source is coupled to the suspended platform. When used in a closed loop vibration control system, locating a motion sensor at or near the force application point on the plant is advantageous, as the effects of bending modes and other extraneous vibrations of other plant structures can be minimized. Such an arrangement improves stability of the closed loop control system. Additional sensors may be located elsewhere as needed.

There are numerous types of rotary actuators, and the system is not limited to use of any particular type of rotary actuator. Rotary actuators can be DC rotating machines or AC rotating machines. They may use permanent magnets or may be induction or switched reluctance machines that do not rely on permanent magnets. Rotary actuators may use rare earth permanent magnets such as NdFeB, or may use less expensive ceramic magnets, or no magnets. Rotary actuators may be hydraulic or pneumatic. In some implementations, the rotary actuator may comprise a motor and a position encoder.

In some rotary actuator, the encoder may be an absolute position encoder of the type described herein that indicates the current position of the motor when it is powered on, and the absolute position encoder may include a magnetic target 100 (e.g., a magnetic disk) for absolute angular position sensing. The absolute position encoder may further be implemented with a decoder logic, such as that described herein, to determine the position of a rotary motor.

Use of an absolute position encoder eliminates the need to first rotate the actuator clockwise or counter-clockwise upon power-up to determine the angular position of the motor in the vibration isolation system. The use of an absolute position encoder makes it possible to determine the angular position of the motor immediately the system is powered-up and eliminate the need for a homing flag.

All or part of the processes described herein are not limited to use in the example contexts described above, but rather may be used in any appropriate context to determine absolute position for any appropriate subject matter. All or part of the processes described herein can be computer-implemented or computer-controlled.

The systems and techniques described herein may be implemented and/or controlled using hardware or a combination of hardware and software. For example, a system like the ones described herein may include various controllers and/or processing devices located at various points. A central computer may coordinate operation among the various controllers or processing devices. The central computer, controllers, and processing devices may execute various software routines to effect control and coordination of testing and calibration.

The systems and techniques can be implemented as, or controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the systems and techniques can be performed by one or more programmable processors executing one or more computer programs to perform the functions described herein. All or part of the systems and techniques can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A vibration isolation system for isolating a suspended platform from a base subject to a vibration input comprising:
an exoskeleton for supporting the suspended platform relative to the base over a range of travel; a rotary motor to generate a force for isolating the suspended platform from the base, the rotary motor having an encoder comprising a magnetic disk encoded with a first set of magnetic transitions and a second set of magnetic transitions, each magnetic transition including a pair of opposite magnetic poles disposed adjacent to one another,
wherein the first set of magnetic transitions is disposed in a substantially circular arrangement having a first radius with respect to the center of the magnetic disk,
wherein angular distances between consecutive transitions in the first set of magnetic transitions are non-uniform,
the second set of magnetic transitions is disposed in a substantially circular arrangement having a second radius with respect to the center of the magnetic disk, the second radius being lesser than the first radius,
and a first number of magnetic transitions in the first set of magnetic transitions is lesser than a second number of magnetic transitions in the second set of magnetic transitions, such that the first set of magnetic transitions represents regions on the magnetic disk, and the second set of magnetic transitions represents locations on the magnetic disk within each of the regions represented by the first set of magnetic transitions; and
wherein the first and second set of magnetic transitions together represent absolute positions of the rotary motor; and
a drive mechanism separate from the exoskeleton for applying the force from the rotary motor between the suspended platform and the base.

2. The vibration isolation system of claim 1, wherein the rotary motor further comprises:
a first sensor to detect a region based on the first set of magnetic transitions;
a second sensor to detect a location within the region detected by the first sensor based on the second set of magnetic transitions; and
a decoder to identify an absolute location on the magnetic disk based on the region detected by the first sensor and the location detected by the second sensors.

3. The vibration isolation system of claim 2, wherein, absent rotation of the magnetic disk, the first sensor detects the region and the second sensor detects the location.

4. The vibration isolation system of claim 2, wherein the first set of magnetic transitions comprises the first number of pairs of opposite magnetic poles disposed in an asymmetric pattern disposed in the substantially circular arrangement having the first radius, the first number corresponding to the number of uniquely identifiable regions on the magnetic disk.

5. The vibration isolation system of claim 4, wherein identifying the absolute location comprises:
determining a threshold value based on the region detected by the first sensor and a tolerance relative to that region;
comparing the second number to the threshold; and
determining the absolute location based on the comparing.

6. The vibration isolation system of claim 5, wherein there is a partial overlap between a portion of an output of the second sensor and a portion of an output of the first sensor identifying a particular region based on the first set of magnetic transitions; and
wherein the tolerance is based on an amount of the overlap.

7. The vibration isolation system of claim 1, wherein the rotary motor is offset to a side of the vibration isolation system base and the drive mechanism is arranged to drive the suspended platform at or near the center of gravity of the suspended platform.

8. The vibration isolation system of claim 1 wherein the rotary motor is inertially coupled to the exoskeleton at a point intermediate between a connection of the exoskeleton to the suspended platform and the connection of the exoskeleton to the base.

9. The vibration isolation system of claim 1, wherein the first set of magnetic transitions is disposed substantially along an outer circumference of the magnetic disk.

10. The vibration isolation system of claim 1, wherein the rotary motor is a direct current (DC) rotating motor.

11. The vibration isolation system of claim 1, wherein the rotary motor is an alternating current (AC) rotating motor.

12. The vibration isolation system of claim 1, further comprising one or more sensors coupled to the rotary motor, the one or more sensors configured to provide input data based on which the rotary motor generates the force.

13. The vibration isolation system of claim 12, further comprising a digital controller disposed between the one or more sensors and the rotary motor, the digital controller configured to generate one or more control signals based on information received from the one or more sensors, the one or more control signals configured to cause the rotary motor to generate the force.

14. The vibration isolation system of claim 1, wherein the first set of magnetic transitions is disposed in the substantially circular arrangement in accordance with a Gray code.

15. The vibration isolation system of claim 2, wherein the first sensor is a Hall effect sensor.

16. The vibration isolation system of claim 2, wherein the first sensor is a part of an array of sensors configured to detect the region based on the first set of magnetic transitions.

17. The vibration isolation system of claim 2, wherein the second sensor is a line array sensor.

* * * * *